Nov. 10, 1964 G. W. WELLS 3,156,883

STEP FREQUENCY OSCILLATOR WITH SEMICONDUCTOR SWITCHING

Filed Nov. 21, 1961 2 Sheets-Sheet 1

INVENTOR
G. W. WELLS
BY Roy M. Porter Jr.
ATTORNEY

Nov. 10, 1964 G. W. WELLS 3,156,883

STEP FREQUENCY OSCILLATOR WITH SEMICONDUCTOR SWITCHING

Filed Nov. 21, 1961 2 Sheets-Sheet 2

INVENTOR
G. W. WELLS
BY Roy M. Porter, Jr.
ATTORNEY 3,156,883

STEP FREQUENCY OSCILLATOR WITH SEMICONDUCTOR SWITCHING

George W. Wells, Springfield, N.J., assignor to Bell Telephone Laboratories, Incorporated, New York, N.Y., a corporation of New York Filed Nov. 21, 1961, Ser. No. 153,908
4 Claims. (Cl. 334—56)

Figure 1:
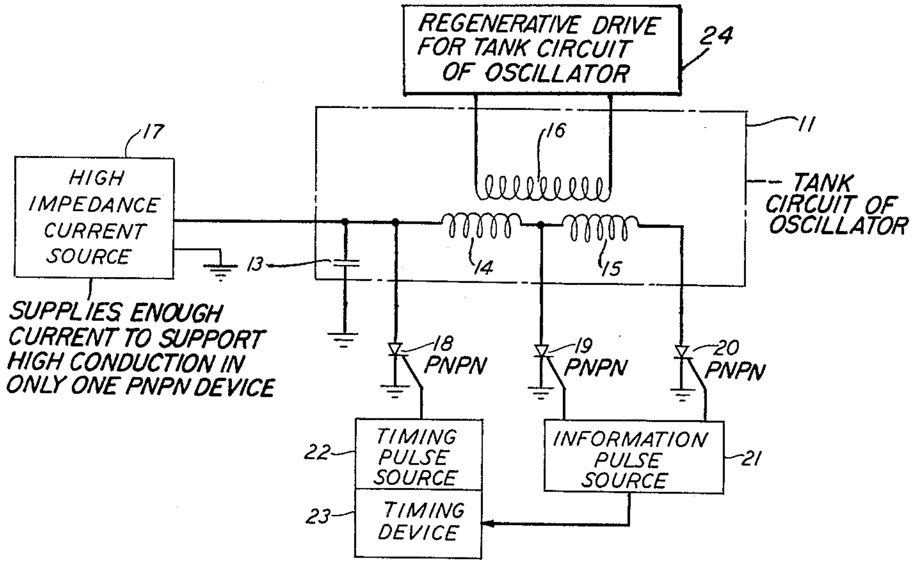

This invention relates to frequency control of oscillators, to switching, and to systems for converting pulse signals to tone signals; more particularly it relates to stepwise frequency control of oscillators by means of coordinated switching. The present application is filed concurrently with the related application of J. A. Hackett, Serial No. 153,813.

An oscillator which can be quickly adjusted in steps to produce a number of different frequencies has a wide range of uses, extending from testing and measuring systems to communications systems. In a telephone system each frequency may correspond to a different digit used in the telephone dialing system. A special and unusually demanding example of this type of system is a centralized repertory dialing system which is designed to be compatible with other telephone multi-frequency systems.

In a centralized repertory dialing system, the customer selects an entire telephone number in one motion and centralized automatic equipment does the dialing for him. The information generated by the customer is most advantageously transmitted by means of a pulse or set of pulses; but it is frequently necessary to actuate existing equipment by means of tones, that is, alternating current waves of discrete frequencies. A different tone or set of tones must be used for every digit of the number that is desired to be dialed. Thus, the frequency or frequencies of an oscillator must be varied stepwise in a desired manner. For this purpose, sections of a tuning element are commonly switched in or out of a tuning circuit.

In the related concurrently filed application of J. A. Hackett, cited above, a method is disclosed for performing the functions mentioned in the preceding paragraph. That invention takes unique advantage of the unusual characteristics of the semiconductor device known to the art as the PNPN triode switch. In particular, the PNPN triode switch has a regenerative characteristic and thus remains in the low or high impedance state even after the removal of the trigger pulse. However, it can be driven from the low impedance state to the high impedance state without a trigger pulse if deprived of a minimum current flow. In that invention, the tuning inductance of an oscillator is varied stepwise by an information pulse which turns on one semiconductor switch, simultaneously removing part of the inductance from the tuning circuit and turning off any other semiconductor switch which was previously removing part of the tuning inductance from the tuning circuit by depriving said other switch of its required minimum current.

The existing telephone equipment actuated by the oscillator is insensitive to the duration of a tone and presents a problem in dialing the same digit twice or more in succession. After one of the PNPN triode switches is turned on, an information pulse applied to that switch to turn it on changes nothing in the oscillator; and the information represented by the repeated pulse is not conveyed farther in the dialing system and is therefore lost.

It is therefore an object of this invention to preserve economically the information contained in the separation of electrical pulse signals during the conversion of said signals to electrical tone signals.

A further object of this invention is to interrupt periodically the oscillation of oscillators which can be tuned stepwise and to reinduce oscillation again at the same or a different frequency without a separate frequency adjustment after oscillation resumes.

According to the present invention, applicant has recognized that the central principle of the invention disclosed in the related application cited above can be utilized to achieve the aforesaid objects. In particular, a PNPN triode switch is introduced into the system so that, when it is in its low impedance condition, it shorts out the tuning capacitance of the oscillator and disables its tank circuit. The low impedance condition is induced by a pulse which is timed to occur between two information pulses.

The next information pulse will turn the oscillator on again, in addition to setting the frequency correctly, by inducing a low impedance condition in the PNPN triode switch to which it is applied and returning the PNPN triode switch which was shorting out the tuning capacitance to a high impedance condition because the latter switch is deprived of the necessary current to sustain its low impedance condition.

Figure 2:
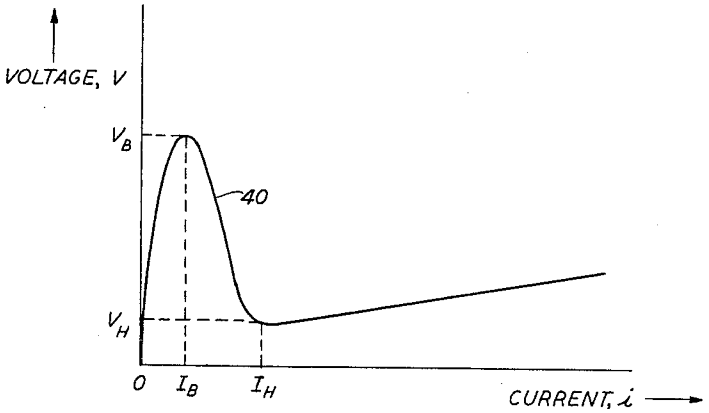
Figure 3:
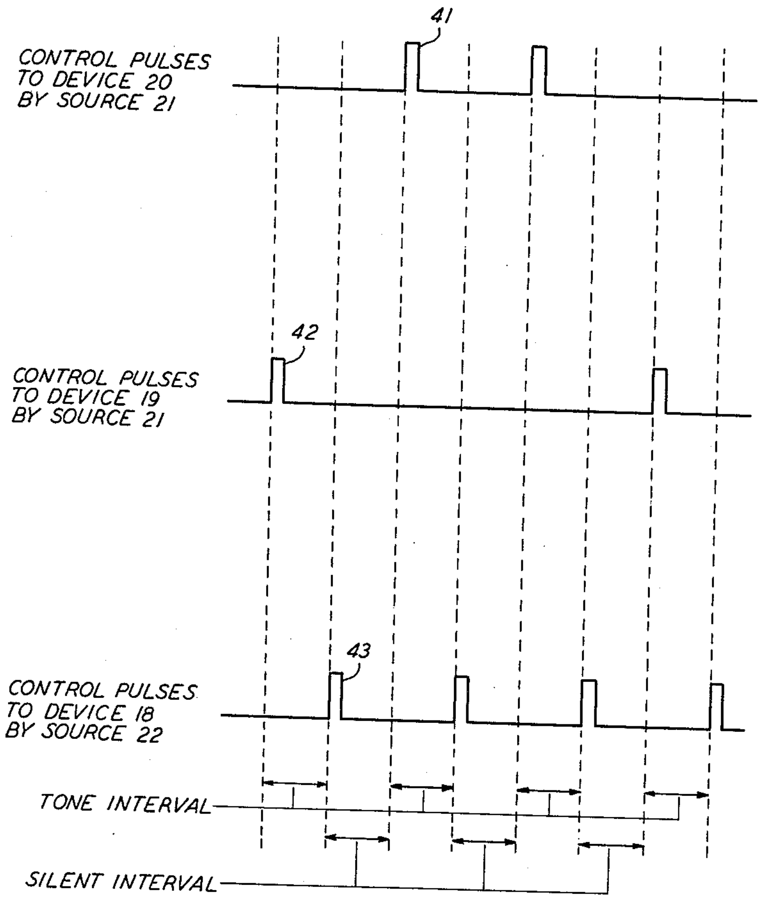

The nature and advantages of the invention will become more apparent from a consideration of the following detailed description and drawing in which:

FIG. 1 is a schematic and block diagrammatic illustration of a specific embodiment of the invention; and FIG. 2 and FIG. 3 show curves which are useful in understanding the theory and operation of the invention.

The specific embodiment of FIG. 1 may employ any type of oscillator which uses inductance-capacitance tuning. Of the oscillator components, only inductance-capacitance tuning circuit 11 is involved in the cooperation which constitutes the principle of operation of the invention. The regenerative drive 24, as is well known in the art, involves amplification, regenerative feedback, bias and limiting. If the amplifying device provides the limiting, the oscillator is known as self-limiting. Other forms of limiting are possible and will tend to decrease distortion of the sine wave output. The output of the oscillator may be taken from a great variety of points within the oscillator system.

The tuning inductance with tuning capacitance 13 creates an L-C tank or tuning circuit 11 to provide the resonance that is necessary for oscillations of a stabilized frequency.

The tuning inductance is composed of inductive sections 14 and 15, which are connected in series, and inductive section 16 which is connected with the regenerative drive circuitry of the oscillator and which has only electromagnetic coupling with sections 14 and 15. The value of the tuning inductance can be determined from well-known physical principles. Sections 14 and 15 must carry a relatively heavy direct current, which is supplied by high impedance current source 17 in order to operate PNPN triode switches 18, 19, and 20. This direct current would complicate the biasing of regenerative drive circuit 24 if caused to flow in inductive section 16. Therefore, inductive section 16 is isolated from the direct current by coupling it purely electromagnetically with sections 14 and 15. Any desired number of other inductive sections may be connected in series with sections 14 and 15. In a telephone system, at least ten such series-connected sections are desirable, since ten different frequencies corresponding to the digits are then easily produced.

PNPN triode switches 18, 19, and 20 provide a means of varying the tuning inductance by removing or inserting section 15 of tank circuit 11 and a means of turning the oscillator on and off. Each can assume a high impedance state or a low impedance state. A description of the manufacture and characteristics of PNPN triode switching devices may be found in United States Patent 2,877,359, issued March 10, 1959, for the invention of I. M. Ross. Each of switches 18, 19, and 20 has its anode connected to a point in the series circuit of sections 14 and 15 and has its cathode connected to ground. In particular, switch 18 has its anode connected to the junction of inductance 14 and capacitance 13. This arrangement means that when one of the PNPN triodes is in a low impedance condition, all sections of the tuning inductance between its anode and ground are prevented from resonating with capacitor 13 and in particular, when switch 18 is in a low impedance condition, capacitor 13 of resonant circuit 11 is shorted out. Each switch cathode might be returned to a different point in the oscillator system so long as the switch could effectively be caused to carry current without leading that same current through another one of switches 18, 19, and 20.

Information pulse source 21 supplies pulses to the control electrodes of semiconductor switches 19 and 20 according to some desired informational sequence. Such a sequence is illustrated by curves 42 and 41 in FIG. 3. In a centralized repertory dialing system, that sequence corresponds to the telephone number that the system has been commanded to dial. The pulses all are of a polarity to turn a switch on.

Timing pulse source 22 generates pulses under the control of timing device 23. Timing device 23 causes source 22 to produce a pulse at a fixed time after each information pulse of source 21 occurs. In FIG. 3, that fixed time is in every case designated as a "Tone Interval" because it represents the duration of each separate tone signal. The "Silent Interval" following each pulse to the control electrode of device 18 represents a period when no tone is transmitted by the oscillator. The timing pulse produced by source 22 is of a polarity to turn on switch 18.

High impedance current source 17 supplies a substantially constant direct current to the series circuit illustrated by inductive sections 14 and 15 regardless of the number or impedance of the inductive sections. Thus, the direct-current resistance of source 17 should be high compared to the sum of the direct-current resistances of sections 14 and 15; and the inductance of source 17 should be high compared to the sum of the inductances of sections 14 and 15 and should have no electromagnetic coupling with them. The relationships just stated are ideal; generally, it is sufficient that the value of the current supplied by source 17 under all conditions is greater than the holding current of any one of the semiconductor switches 18, 19, and 20, which is designated as $I_H$ on curve 40 of FIG. 2, but is less than the sum of the $I_H$ values for any two of them. Even the latter requirement can be evaded to some degree when PNPN triode switches are used because such a device can be made to draw more current than its holding current with the initial aid of a control pulse from source 21.

Each of PNPN semiconductor triode switches 18, 19, and 20 possesses a regenerative characteristics such that, when it is turned on by a pulse applied to its control electrode, it will stay on so long as it receives at least its holding current, which is designated as $I_H$ on curve 40 of FIG. 2. It is a low impedance device when so operating.

Switches 18, 19, and 20 can be turned on only by pulses applied to their control electrodes because the series circuit consisting of inductive sections 14 and 15 and high impedance current source 17 is arranged so that the voltage applied to the anode of each switch is always below the breakdown value for that switch which is designated as $V_B$ on curve 40 of FIG. 2. In the preferred embodiment of the invention, switches 18, 19, and 20 are identical since the voltage drops across sections 14 and 15 are small enough not to interfere with the principle of operation of the invention. That is, the sum of voltage drops across sections 14 and 15 are appreciably smaller than the breakdown voltage, $V_B$, of semiconductor switch 18.

In operation, only one of semiconductor switches 18, 19, and 20 can conduct at any given time because of the current-limiting effect of source 17, discussed above. Thus, the oscillator is either off or oscillating at a predictable frequency. For instance, if semiconductor switch 19 is conducting, then its anode is a virtual ground and section 15 of the tuning inductance is effectively removed from tank circuit 11. Section 14, together with the coupling effect or mutual inductance of inductance 16, determines the tuning inductance. Inductance section 14 and magnetically coupled inductance 16 resonate with tuning capacitance 13 to determine the output frequency of the oscillator. The alternating currents produced in inductive section 14 and capacitor 13 by resonance are small enough in relation to the current supplied by source 17 that semiconductor switch 19 is not deprived of its holding current. Semiconductor switches 18 and 20 are in their high impedance state, represented by the portion O–$V_B$ of curve 40 of FIG. 2, and thus they do not appreciably affect the resonance condition.

If subsequently the control electrode of semiconductor switch 20 receives a pulse from pulse source 21, it will turn on and stay on if sufficient current is available at its anode. The principal problem at this point is to provide that switch 19 will turn off while switch 20 is turning on.

This can be done if switch 19 has a minimum current value below which it will no longer present a low impedance condition. This is true of the four-layer semiconductor triodes described above. When the current of such a switch is forced below the $I_H$ value shown in curve 40 of FIG. 2, it will cease to conduct and will assume its high impedance condition. When switch 20 receives a signal from pulse source 21 to turn on, it assumes a state of very low impedance, lower than the impedance previously exhibited and even lower than its conduction impedance in the absence of the control pulse; and it thus succeeds in taking current away from switch 19. The control pulse is wide enough to outlast the induced electromotive force in section 15 which opposes the rise of current in section 15 and switch 20. Finally, the current in switch 20 increases to the point that switch 19 is left with a current below its holding current and turns off, because, as stated above, high impedance current source 17 cannot increase its output. It will further be noticed that, because of the regenerative characteristic illustrated by curve 40 of FIG. 2, after switch 20 has received its holding current, $I_H$, it remains on after the turn-on pulse has disappeared from its control electrode. Section 15 now plays a role in determining the tuning inductance.

The oscillator can also be turned off in a similar manner. After the oscillator has been oscillating long enough for its output tone to perform the desired function, such as dialing one digit of a telephone number, timing device 23 causes timing pulse source 22 to apply a pulse, as shown in curve 43 of FIG. 3, to the control electrode of switch 18. The pulse has a polarity to cause switch 18 to take current away from sections 14 and 15 and switch 20. The induced electromotive force of sections 14 and 15 which opposes this change merely succeeds in discharging any electromagnetic energy stored in the field of sections 14 and 15. The control pulse is wide enough eventually to prevail. Switch 18 receives its holding current, and switch 20 loses its holding current and turns off. Capacitor 13 of tank circuit 11 is now shorted out, and tank circuit 11 cannot oscillate.

The spacing of pulses from information pulse source 21 is such that the oscillator will remain off for a period designated "Silent Interval" in FIG. 3, that is detectable by the subsequent telephone equipment. If now a new information pulse is applied by source 21 to the control electrode of switch 20, which was on just before switch 18 came on, switch 20 eventually obtains current sufficient to deprive switch 18 of its sustaining current and causes the latter to turn off. Switch 20 will now remain on after the information pulse has disappeared from its control electrode. The subsequent telephone equipment now can react to the new information even though the frequency of oscillation has not changed. A like situation occurs if switch 19 instead of switch 20 is turned on, except that the frequency is now different. Thus, dialing the same digit repetitively and dialing different digits successively are executed with like facility and economy of equipment.

This invention is particularly claimed herein, although also disclosed in the concurrently filed application cited in the introductory paragraph of the present application.

It is well known in the art that functions which can be performed with the aid of currents can be performed in an analogous manner with the aid of voltages, and that functions which can be performed with the aid of inductances can also be performed in an analogous manner with the aid of capacitances. Thus, the invention can also be practiced with bistable voltage-sensitive electrical switching devices.

In all cases it is understood that the abovedescribed arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A system for converting pulse signals into tone signals, comprising a source of information pulse signals, an oscillator having a tuning capacitance and a tuning inductance and means for varying its output frequency in response to said information pulse signals, means for producing timing signals at predetermined times between said information pulse signals, means for applying said timing signals to short out one of said tuning capacitance and said tuning inductance of said oscillator to terminate oscillations of said oscillator, and a coordinated switching arrangement adapted in response to one of said information pulse signals simultaneously to unshort said one of said capacitance and said inductance and to select said output frequency.

2. Apparatus for tuning an oscillator, comprising a resonant circuit characterized by a resonant frequency, a plurality of devices with first and second stable states of operation characterized by different ranges of current and voltage parameters, means for affecting said resonant frequency to an extent depending upon which of said devices are operating in said first stable state including means for disabling said resonant circuit when a particular one of said devices is operating in said first stable state, a source of electrical energy with means for limiting one of said parameters to a value in said range characteristic to said first stable state, said energy source being interconnected with said devices, said devices comprising a circuit across said source for dividing said one parameter, a source of information signals, means to impress said information signals upon selected ones of said devices not including said particular device for inducing said first stable state in said selected devices with values of said one parameter approaching said limited value to deprive all of said devices except said selected devices of values of said one parameter characteristic to said first stable state, a source of periodic timing signals occurring at predetermined times after said information signals, and means to impress said timing signals upon said particular device for inducing said first stable state in said particular device with values of said one parameter approaching said limited value to deprive all of said devices except said particular device of values of said one parameter characteristic to said first stable state.

3. An oscillator with means for varying its output frequency in steps, comprising a frequency-determining circuit including an element in a plurality of series-connected sections capable of sustaining direct-current flow, a plurality of semiconductive devices having a regenerative characteristic between two finite values of conduction current connected with said element to vary said frequency in steps by depriving a variable number of said sections of current flow depending upon which of said devices experiences the higher of said two finite values including a particular one of said devices connected to deprive all of said sections of current flow, a source of information pulses, means to apply said information pulses to selected ones of said devices not including said particular device to induce a current transmission condition thereof, a source of timing pulses occurring at fixed times after said information pulses, means to apply said timing pulses to said particular device to induce a current transmission condition thereof, and a source of current for said element and devices, said devices being connected in multiple shunt paths across said current source, said current source being capable of providing for any one of said devices a conduction current which exceeds the higher one of said two finite values but which source is incapable of providing for more than one of said devices a conduction current which exceeds the higher one of said two finite values.

4. In combination, an oscillator with a resonant circuit including a capacitance and an inductance in a plurality of series-connected sections, a source of current connected across said capacitance and delivering a substantially constant current not exceeding a predetermined maximum, a plurality of four-layer semiconductor triode switches having minimum currents necessary to sustain a turned-on condition the sum of any two of which currents exceeds said predetermined maximum and having two electrodes connected in series with a portion of said sections across said capacitance, said plurality including a particular one of said switches with two electrodes connected in series with none of said sections across said capacitance, a source of information pulses, means to apply each of said pulses to the third electrode of a selected one of said triode switches with a polarity to tend to turn on said selected switch, a source of timing pulses occurring between said information pulses, and means to apply said timing pulses to the third electrode of said particular switch to tend to turn on said particular switch.

No references cited.